(12) United States Patent
Novakovsky et al.

(10) Patent No.: US 8,996,833 B2
(45) Date of Patent: Mar. 31, 2015

(54) MULTI LATENCY CONFIGURABLE CACHE

(71) Applicants: Larisa Novakovsky, Haifa (IL);
Alexander Gendler, Kiriat Motzkin (IL); Ohad Stauber, Raanana (IL)

(72) Inventors: Larisa Novakovsky, Haifa (IL);
Alexander Gendler, Kiriat Motzkin (IL); Ohad Stauber, Raanana (IL)

(73) Assignee: Intel Corporation, Santa Clara, CA (US)

( * ) Notice: Subject to any disclaimer, the term of this patent is extended or adjusted under 35 U.S.C. 154(b) by 197 days.

(21) Appl. No.: 13/793,045

(22) Filed: Mar. 11, 2013

(65) Prior Publication Data
US 2014/0258618 A1 Sep. 11, 2014

(51) Int. Cl.
*G06F 12/00* (2006.01)
*G06F 12/08* (2006.01)

(52) U.S. Cl.
CPC ................................. *G06F 12/0802* (2013.01)

USPC ............................ 711/167; 711/115; 711/118

(58) Field of Classification Search
USPC .......................................... 711/115, 118, 167
See application file for complete search history.

(56) References Cited

U.S. PATENT DOCUMENTS

| | | | |
|---|---|---|---|
| 5,175,826 A * | 12/1992 | Begun et al. ................... | 711/118 |
| 5,426,771 A * | 6/1995 | Asprey et al. ................. | 711/118 |
| 6,460,124 B1 * | 10/2002 | Kagi et al. ..................... | 711/163 |
| 7,934,069 B2 * | 4/2011 | Cochran et al. ............... | 711/167 |
| 8,856,452 B2 * | 10/2014 | Sun et al. ...................... | 711/137 |
| 2010/0199050 A1 * | 8/2010 | LaFrese et al. ............... | 711/142 |
| 2011/0296107 A1 * | 12/2011 | Li et al. ......................... | 711/118 |
| 2014/0122802 A1 * | 5/2014 | Koka et al. .................... | 711/118 |

* cited by examiner

*Primary Examiner* — John Lane
(74) *Attorney, Agent, or Firm* — Lowenstein Sandler LLP

(57) ABSTRACT

Described herein are technologies for optimizing different cache configurations of a size-configurable cache. One configuration includes a base cache portion and a removable cache portion, each with different latencies. The latency of the base cache portion is modified to correspond to the latency of the removable portion.

25 Claims, 7 Drawing Sheets

MULTI LATENCY CONFIGURABLE CACHE

TECHNICAL FIELD

The present disclosure pertains to the field of computer processing device architecture, and more specifically to cache configurations of processing devices.

BACKGROUND

In computer engineering, computer architecture is a combination of microarchitecture and an instruction set. The microarchitecture designates how a given instruction set architecture is implemented in a processing device. Designing microarchitecture can be complex and can take significant time and resources. Conventionally, a given microarchitecture may be uniquely designed for different platforms. A client platform, for example, typically has a different design than that of a server platform. Although the different platforms can share some aspects of the microarchitecture, each platform has different requirements and thus has a unique design. A microarchitecture design may go through various stages, including creation, simulation, fabrication and testing. As a result, different design teams can be tasked for uniquely designing the platform-specific platforms over a period of years.

DESCRIPTION OF EMBODIMENTS

Figure 1:
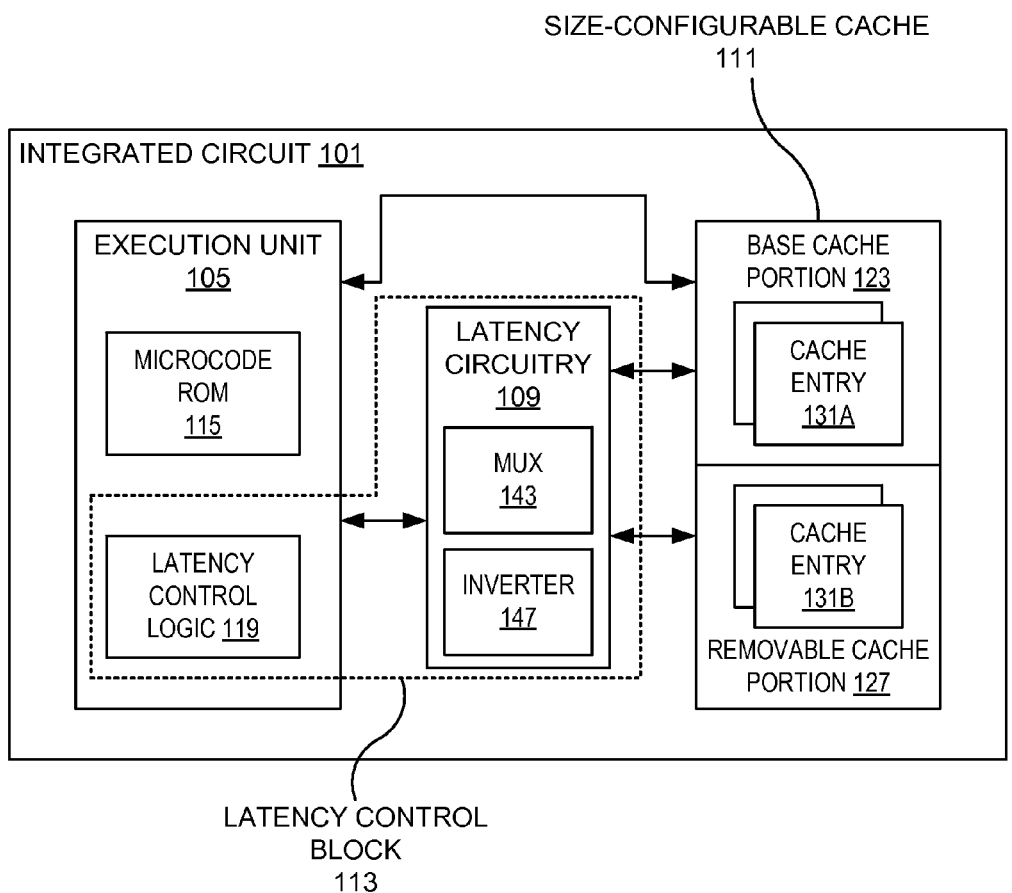
FIG. 1 is a block diagram of an example integrated circuit including a size-configurable cache and latency control block according to one implementation.

In the following description, numerous specific details are set forth, such as examples of specific types of processors and system configurations, specific hardware structures, specific architectural and micro architectural details, specific cache configurations, specific register configurations, specific instruction types, specific system components, specific measurements/heights, specific processor pipeline stages and operation etc. in order to provide a thorough understanding of the present invention. It will be apparent, however, to one skilled in the art that these specific details need not be employed to practice the present invention. In other instances, well known components or methods, such as specific and alternative processing device architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system have not been described in detail in order to avoid unnecessarily obscuring the present invention.

The embodiments described herein are directed to size-configurable caches and controlling latencies for different cache configurations of the size-configurable cache. One integrated circuit can include an execution unit and a size-configurable cache that is communicably connected to the execution unit. Like typical caches, the size-configurable cache can store frequently-used or recently-used data closer to a processing device than the memory. Such data is retrieved from memory and stored in a cache entry. When the execution unit executes an instruction associated with a memory location, the execution unit can check for data corresponding to the memory location in the cache. If the cache contains the data corresponding to the memory location, the execution unit can use the cached data to save time when performing the access operation.

The size-configurable caches described herein can be used to accommodate different computing platforms. In one embodiment, the size-configurable cache can include a base portion and a removable portion for different cache configurations. For example, the size-configurable cache in a first cache configuration can be when the removable portion is not removed. The same size-configurable cache in a second cache configuration can be when the removable portion is removed. In other embodiments, one or more base portions can be used and one or more removable portions. The integrated circuit can also include a latency control block coupled between the execution unit and the size-configurable cache. The latency control block is configured to set a first latency for the size-configurable cache in the first configuration and to set a second latency for the size-configurable cache in the second configuration. In this manner, the latency control block can be used to control latencies between the execution unit and the size-configurable cache in the different configurations. Traditionally, when the same architecture is used in two different platforms, the latencies are set and fixed for one platform and the other platform is also set with the same latencies. In one cache configuration, an access operation to a cache entry of the base portion corresponds to the first latency as described herein. In another cache configuration, the access operation to the same cache entry corresponds to the second latency as described herein.

As described above, a microarchitecture design may go through various stages, including creation, simulation, fabrication and testing, which may be over a period of years. Moreover, a microarchitecture design may be adapted for different platforms, such as one design for a client platform and another for a server platform. To reduce costs associated with designing multiple processor architectures, one architecture design for one platform can be created and used as a basis for other architectures for other platforms. The size-configurable cache and latency control technologies described herein can facilitate multiple platform-agnostic cache configurations because the latency control allows the latencies to be set for different platforms that use the same architecture design without uniquely designing different integrated circuits for the different platforms. For example, different platforms can include various configurable features (e.g., physical cache sizes, cache capacities, proximity to computational elements, number of ways in an N-way associative cache, power schemes, latencies, etc.) that can be optimized per the platform based on typical implementation preferences. For example, for client platforms, physical size of the cache can be reduced, which can provide a shorter latency for performing cache access operations. For server platforms, cache capacity may be more important. As such, for server platforms, the cache capacity can be increased. The increased cache capacity, however, may increase cache latency. Using the technologies described herein a base architecture can be configured for multiple platforms, thus obviating a need to uniquely design different designs for different platforms. Further, using the base architecture as a basis for the multiple platforms can reduce an overall design time, the time to market, materials costs, and the like.

FIG. 1 illustrates a block diagram of an example integrated circuit 101. The integrated circuit 101 can include one or more functional hardware units, such as a size-configurable cache 111 and latency control block 113. The integrated circuit 101 can include an execution unit 105 to perform algorithms for processing data, such as executing cache access operations. The latency control block 113 (e.g., latency circuitry 109, latency control logic 119) can set latencies for different cache configurations in accordance with one embodiment. One embodiment may be described in the context of a single processor system, but alternative embodiments may be included in a multi-processor system.

In this illustrated embodiment, integrated circuit 101 includes one or more execution units 105 to implement an algorithm that is configured to perform at least one instruction. For example, the execution unit 105 may perform various integer and floating point operations (e.g., shifts, addition, subtraction, multiplication) and on various types of data (e.g., scalar floating point, packed integer, packed floating point, vector integer, vector floating point). Execution unit 105, including logic to perform the various integer and floating point operations. While some embodiments may include a number of execution units dedicated to specific functions or sets of functions, other embodiments may include one execution unit or multiple execution units that all perform all functions. Execution unit 105 can use pipelining techniques to simultaneously execute multiple operations. Execution unit 105 can include one or more address generation unit (AGU), arithmetic logic unit (ALU), or the like. When the execution unit 105 executes instructions to perform an access operation (e.g., read, write) for data in memory, it can check for a corresponding cache entry 131 in the size-configurable cache 111 before retrieving the data from memory. For example, the execution unit 105 may execute an instruction that performs an access operation on the size-configurable cache 111. Memory can be any of type of storage medium that is farther away from the execution unit 105 and can include other caches that are higher levels. Memory, as used in this context, can also include storage devices, such as disks, hard drives, etc.

The size-configurable cache 111 can have a base cache portion 123 and a removable cache portion 127 to facilitate multiple cache configurations of the integrated circuit 101. The base cache portion 123 is designed as a base cache design that can be common to all platforms. Some or all of the removable cache portion 127 can be removed as optional cache portions depending on the different platforms to which the integrated circuit 101 is to be used. By removing some or all of the removable cache portion 127, the integrated circuit 101 can have different cache configurations for multiple platforms (e.g., server platform, client platform or the like). When the integrated circuit 101 is used in a server platform, the size-configurable cache 111 can have a first cache size (e.g., includes both the fixed cache portion). When the integrated circuit 101 is used in a client platform, the size-configurable cache 111 can have a second cache size (e.g., includes the base cache portion). For example, an integrated circuit for a server can have a cache size of 1 megabyte (MB) and an integrated circuit for a client can have a cache size of 256 kilobytes (KB). The integrated circuit for both the client and the server can have the base cache portion 123, while the server integrated circuit includes the removable cache portion 127 and the client integrated circuit does not. In this manner, the designs of the client integrated circuit and the server integrated circuit can be the same or similar, notwithstanding the removable cache portion 127. In one implementation, the base cache portion 123 can be physically closer to the execution unit 105 than the removable cache portion 127. In another embodiment, the base cache portion 123 can be located in other locations relative to the execution unit and the removable cache portion 127. In further embodiments, the integrated circuit 101 can have removable execution units 105 that can be added or removed for specific configurations.

Both the base and the removable cache portions of the size configurable cache 111 can include one or more cache entries 131. The cache entry 131 can store an address location in memory where the data is stored and a data block that contains a copy of the data stored in memory at that address location. The address location is sometimes referred to as a tag and the data block is sometimes referred to as a cache line that contains data previously fetched from the main memory.

The base cache portion 123 can be located at different physical position on the integrated circuit 101 than the removable cache portion 127. For example, the base cache portion 123 is located at a first position that is a first distance from the execution unit 105 and the removable cache portion 127 is located at a second position that is a second distance from the execution unit 105. The distances may impact the latencies of the different cache portions. Each physical position can correspond to a different latency for access operations to the cache portions. Latency refers to an amount of time it takes for the execution unit 105 to access (e.g., read, write, evict) a cache entry 131 in the size-configurable cache 111. The latency can be measured in one or more clock cycles. Alternatively, the latency can be measured using other metrics, such as a number of clock cycles the execution unit 105 takes to access a cache entry 131 in the size-configurable cache 111. Latency may increase with the size of the cache, physical distance from the execution unit 105, or a combination of both. For cache configurations that include both the base cache portion 123 and the removable cache portion 127, the removable cache portion can have a longer latency since it is physically further from the execution unit than the base cache portion 123.

Latency control block 113 can be used to handle different latencies for different cache configurations. The integrated circuit 101 may be programmed to expect different latencies depending on the cache configuration. The latency control block 113 can identify the programmed configuration of the size-configurable cache 111. For example, the latency control block 113 can identify whether the integrated circuit 101 includes the removable portion 127. If the removable portion 127 is present, the latency control block 113 can further identify the size, capacity or other characteristics of the removable cache portion 127. Using the identified configuration of the size-configurable cache 111, the latency control block 113 can expect a corresponding latency and communicate that latency to the execution unit 105. For example, if latency control block 113 detects a first configuration where both the base and removable cache portions are present, the latency control block 113 can expect a first latency (e.g., ten clock cycles). Similarly, if the latency control block 113 detects a second configuration (e.g., removable cache portion 127 is removed from the size-configurable cache 111), the latency control block 113 can expect a second latency (e.g., five clock cycles). The configuration of the size-configurable cache can be detected at any time, including on system boot, at run-time, or when installing the microcode on the integrated circuit. In one implementation, a default latency of the integrated circuit 101 corresponds to the latency of the base cache portion 123. Alternatively, the default latency can correspond to the latency of one of the cache configurations and adjustments to the latency can be made for the other different cache configurations.

For cache configurations that include different latencies for different portions of the size-configurable cache (e.g., the based cache portion 123 has a faster latency than the removable cache portion 127), the latency control block 113 can introduce a delay for access operations to the faster base cache portion 123. Access operations to base cache portion 123 may be delayed such that they are ready on the same clock cycle as access operations for the removable cache portion 127. The delay can also be introduced to prevent an access operation in the pipeline from executing outside its designated clock cycle. The delay can also be used to prevent hazards, conflicts, or the like. When the execution unit 105 performs pipelined operations on both the base and removable cache portions, the latency control block 113 can delay access operations for cache entry 131A on the base cache portion 123 such that the execution unit 105 can perform access operations on cache entry 131A and cache entry 131B within the same pipeline. The introduction of the delay for access operations for base cache portion 123 can result in access operations to different cache locations in the size-configurable cache 111 having different latencies depending on the portion in which the physical location is located.

In one embodiment, the latency control block 113 includes latency circuitry 109 and latency control logic 119 to control or delay access operations. In a further embodiment, the latency control block 119 is part of the execution unit 105. In other embodiments, the latency control block 119 is part of other components of the integrated circuit 101. Latency circuitry 109 can be physical circuitry to execute latency control. Latency control logic 119 can be processing logic within the execution unit, instructions executed by the execution unit, or a combination of both. Latency control logic 119 can also be implemented as a hardware state machine, programmable logic of a programmable logic array (PLA), as part of the microcode, or any combination thereof. Examples of latency circuitry include a multiplexer ("mux") 143 and an inverter 147, each described in further detail in conjunction with FIG. 2. Using the latency circuitry 109 and/or the control logic 119, the latency control block 113 can delay access operations by one or more clock cycles, by a portion of a clock cycle (e.g., half clock cycle), or by one or more clock cycles plus a portion of a clock cycle (e.g., one and one-half clock cycle).

In some embodiments, the latency control logic 119 determines that latency needs to be changed in some scenarios and instructs the latency circuitry 109 to introduce or remove latencies accordingly. For example, the latency control logic 119 can determine that the access operation is directed to the base portion in the first configuration and instruct the mux 143 to select a delayed path to introduce a delay. For another example, the latency control logic 119 can determine that the access operation is a write operation for the base cache portion in the first configuration and can instruct an inverter 147 to operate according to an inverted clock so as to introduce a delay. In one embodiment, the access operation is at least one of a tag lookup, a tag write, tag eviction, a data read, or a data write, as described in conjunction with FIGS. 3A and 3B. In other embodiments, the functionality of the block can be implemented in just the latency control logic 119, in just the latency circuitry 109, or a combination of both as described above.

The integrated circuit 101, in one embodiment, includes a microcode (ucode) ROM 115 to store microcode, which when executed, is to perform algorithms for certain macroinstructions or handle complex scenarios. The microcode can include instructions for multiple of platforms, platform configurations, cache configurations and their corresponding latencies. Alternate embodiments of an execution unit 105 may also be used in micro controllers, embedded processors, graphics devices, DSPs, and other types of logic circuits. Latency control can be implemented wholly or partially in the microcode.

Any number of cache configurations and cache sizes for any number of platforms are contemplated. Depending on the architecture, the integrated circuit 101 may have a single internal cache or multiple levels of internal caches. For example, cache elements can be disposed within the one or more cores, outside the one or more cores, and even in external to the integrated circuit. The cache may be L1 cache, or may be other mid-level caches, such as level 2 (L2), level 3 (L3), level 4 (L4), or other levels of cache, a last level cache (LLC), and any combinations thereof.

For cache configurations with multiple cache levels, latency control block 113 can configure the size-configurable cache 111 to be inclusive or non-inclusive to increase cache performance of a particular platform. For example, a server platform may perform faster when its size-configurable cache 111 is in a non-inclusive configuration. Likewise, a client platform may have better performance when in its size-configurable cache 111 is in an inclusive configuration. Other embodiments include a combination of both internal and external caches depending on particular implementations. In one implementation, the size-configurable cache 111 is located physically closer to the execution unit 105 than main memory (not shown) to take advantage of spatial aspects of the principle of locality.

Integrated circuit 101 can be representative of processing systems based on the PENTIUM III™, PENTIUM 4™, Celeron™, Xeon™, Itanium, XScale™, StrongARMT™, Core™, Core 2™, Atom™, and/or Intel® Architecture Core™, such as an i3, i5, i7 microprocessors available from Intel Corporation of Santa Clara, Calif., although other systems (including PCs having other microprocessors, engineering workstations, set-top boxes and the like) may also be used. However, understand that other low power processors such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters may instead be present in other embodiments such as an Apple A5/A6 processor, a Qualcomm Snapdragon processor, or TI OMAP processor. In one embodiment, integrated circuit 101 executes a version of the WINDOWS™ operating system available from Microsoft Corporation of Redmond, Wash., although other operating systems (OS X, UNIX, Linux, Android, iOS, Symbian, for example), embedded software, and/or graphical user interfaces, may also be used. Thus, embodiments of the present invention are not limited to any specific combination of hardware circuitry and software. Embodiments are not limited to computer systems. Alternative embodiments of the present invention can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip (SoC), network computers (NetPC), set-top boxes, network hubs, wide area network (WAN) switches, or any other system that can perform one or more instructions in accordance with at least one embodiment. In one embodiment, the execution unit 105, at least a portion of the size-configurable cache 111 and the latency control block 113 are integrated into at least one of a processor core or a graphics core. The described blocks can be hardware, software, firmware or a combination thereof.

Figure 2A:
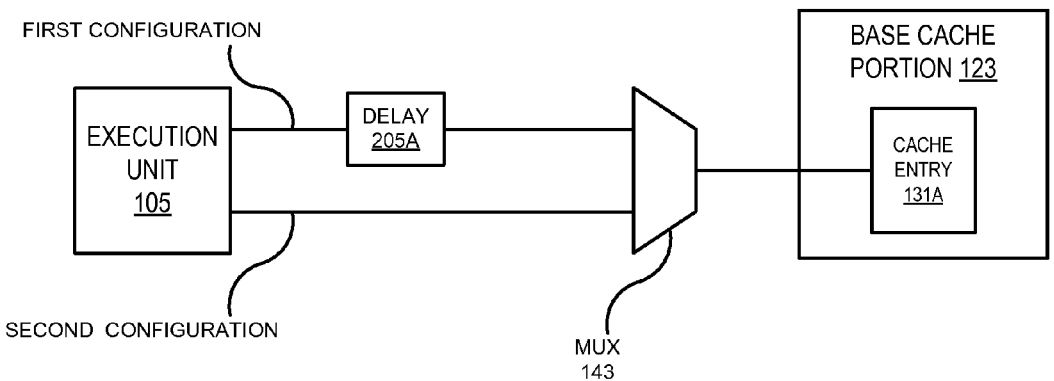
FIGS. 2A-2B are circuit diagrams that illustrate examples of latency circuitry for introducing a delay for access operations in certain cache configurations according to one implementation.
Figure 2B:
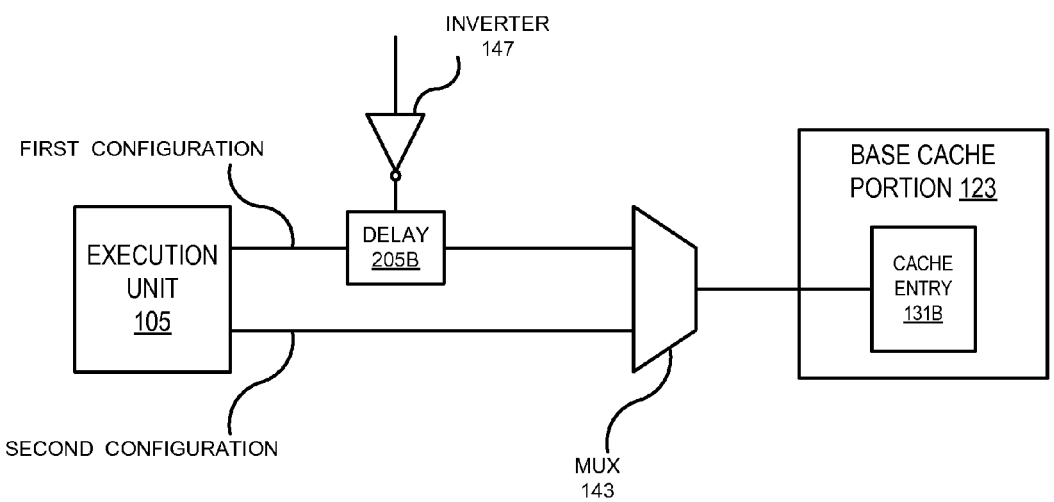

FIGS. 2A and 2B are circuit diagrams that illustrate examples of latency circuitry 109 for introducing a delay 205 for access operations in certain cache configurations. In one embodiment, when the size-configurable cache 111 is in the first configuration with both the base and removable cache portions, the latency circuitry 109 can use a mux 143 to select a delayed path to introduce a delay 205 for access operations to a cache entry 131A on the base cache portion 123. When the size-configurable cache is in the second configuration, the mux 143 can be used to select a path without delay 205. For example, when performing a tag lookup access operation (e.g., a read), data from the cache 111 can be accessed and reported back to the execution unit 105. In another embodiment, when the size-configurable cache is in the first configuration, the mux 143 can be used to select a delayed path to introduce delay 205 for an access operation to cache entry 131A.

FIG. 2A is a circuit diagram that illustrates an example latency circuitry 109 that includes the mux 143 to select a delayed path to introduce a delay 205A to an operation for cache entry 131A according to one embodiment. The delay 205A can be any amount of time, including any multiple of a clock cycle.

FIG. 2B is a circuit diagram that illustrates an example latency circuitry 109 that includes the mux 143 and an inverter 147. The mux 143 can be used to select a delayed path to introduce a delay 205B to an operation for cache entry 131B according to one embodiment. The inverter 147 can delay the operation by one or more phases (e.g., a fraction of a clock cycle). For example, in a tag write operation, an address tag is written to cache entry 131B. The write operation can take a fraction of the time it takes to perform a lookup operation in the same pipeline stage and the inverter 147 can be used to delay the operation so it is ready on the same clock cycle as other operations within the same pipeline stage. When in the second configuration, the mux 143 can select a path to forward data without introducing a delay.

Figure 3A:
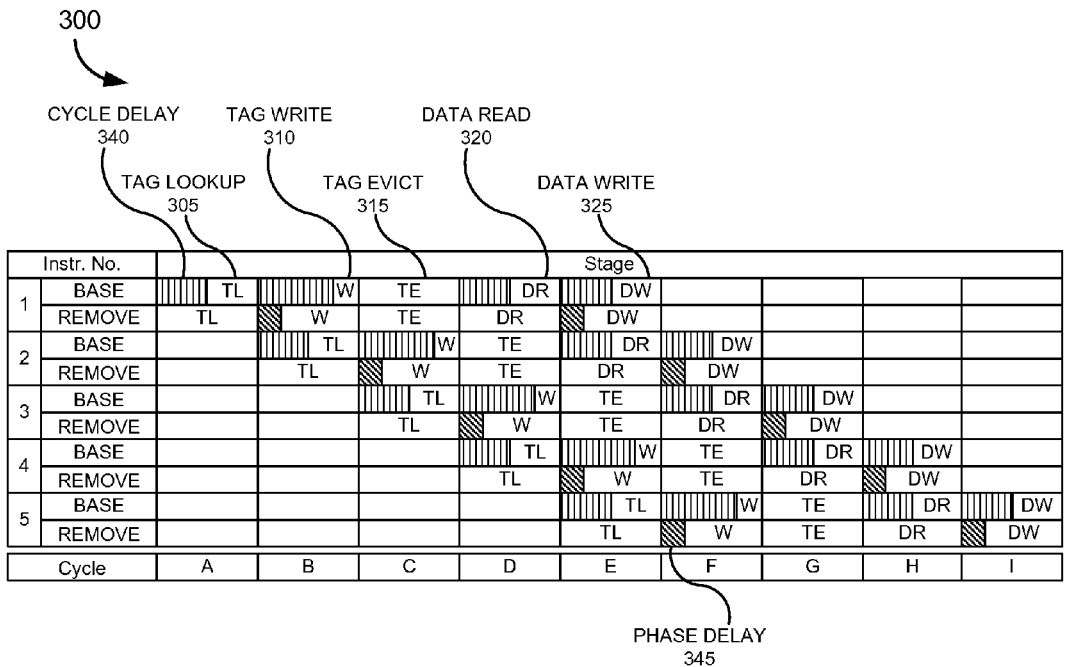
FIGS. 3A-3B are timing diagrams of sample processing pipelines according to implementations.
Figure 3B:
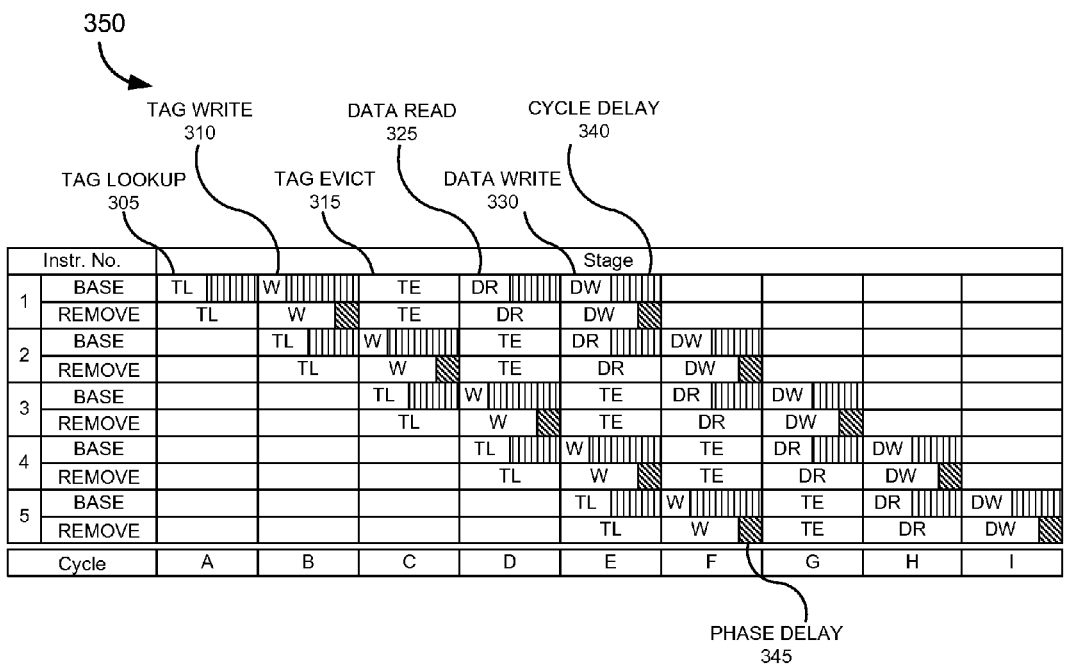

FIGS. 3A and 3B are timing diagrams 300, 350 of sample pipeline timings with five pipeline stages in the pipeline according to embodiments of the first cache configuration of the integrated circuit 101. The pipeline can include additional or fewer stages than the depicted embodiment. The boxes with diagonal lines in FIGS. 3A and 3B illustrate a cycle delay 340 that can be one or more clock cycles and the boxes with vertical lines illustrate a phase delay 345 that can be a fraction of a clock cycle. The phase delay can also be one or more clock cycles plus a fraction of a clock cycle.

Instructions in the processor pipeline can be executed by components of the integrated circuit 101 (e.g., one or more execution units 105) in stages that include a tag lookup (TL) stage 305, a tag write (TW) stage 310, a tag eviction (TE) stage 315, a data read (DR) stage 320, and a data write (DW) stage 325. The integrated circuit 101 or components thereof can execute one or more instructions using processor pipeline 300, 350 in cycles (e.g., A, B, C, D, E, F, G, H, I), where one stage is completed within a cycle. Each stage may be completed in one clock cycle. Alternatively, each state may be completed in multiple clock cycles. By way of example, the execution unit 105 may implement the pipeline timing as follows: 1) the tag lookup stage 305 to look up a tag on a cache entry; 2) the tag write stage 310 to write the tag to a cache entry; 3) the tag eviction stage 310 to remove a tag from a cache entry; 4) the data read stage 320 to lookup and retrieve data from the cache; and 5) the data write stage to write data to the cache.

In one implementation, the integrated circuit 101 receives five instructions, each instruction having access operations to execute on both the base and removable cache portions. The removable cache portion can have a longer latency than the base portion because the removable cache portion is further from the execution unit 105 and/or can be larger in size than the base cache portion. Accordingly, a cycle delay 340 can be introduced by the integrated circuit 101 to match latencies of the base and removable cache portions such that the access operations are complete on the same cycle. If the size-configurable cache is in a first configuration with a longer latency, then responses from base cache, which has a faster latency, are delayed such that all portions of the cache (e.g., fixed, removable) have same latency. The integrated circuit 101 or execution unit 105 can introduce a delay in any stage in the pipeline 300, 350, by any duration, including by one or more clock cycles, phases, or any combination thereof.

In an example, the tag write stage is delayed by at least one phase. The tag write stage can take half as long as a tag lookup so it can be delayed by a phase instead of a full clock cycle. Delaying a cache access operation by a phase can be used to introduce delays without delaying all operations in the pipeline. For example, for a cache with a five-clock-cycle latency, the tag lookup stage takes all five clock cycles. The tag write stage can take less than five clock cycles to complete, such as two and a half clock cycles. To introduce a full clock cycle delay could also introduce a half clock cycle or more delay to other access operations in the pipeline. Accordingly, a phase delay 345 of two and a half a clock cycles is introduced.

FIG. 3A illustrates cycle delays 340 and phase delays 345 for cache access operations on the base portion being introduced at the beginning of a cycle such that access operations on the base and removable cache portions complete at substantially the same time.

FIG. 3B illustrates cycle delays and phase delays for cache access operations on the base portion being introduced after the operation such that it is held or suspended until the end of the cycle.

Figure 4:
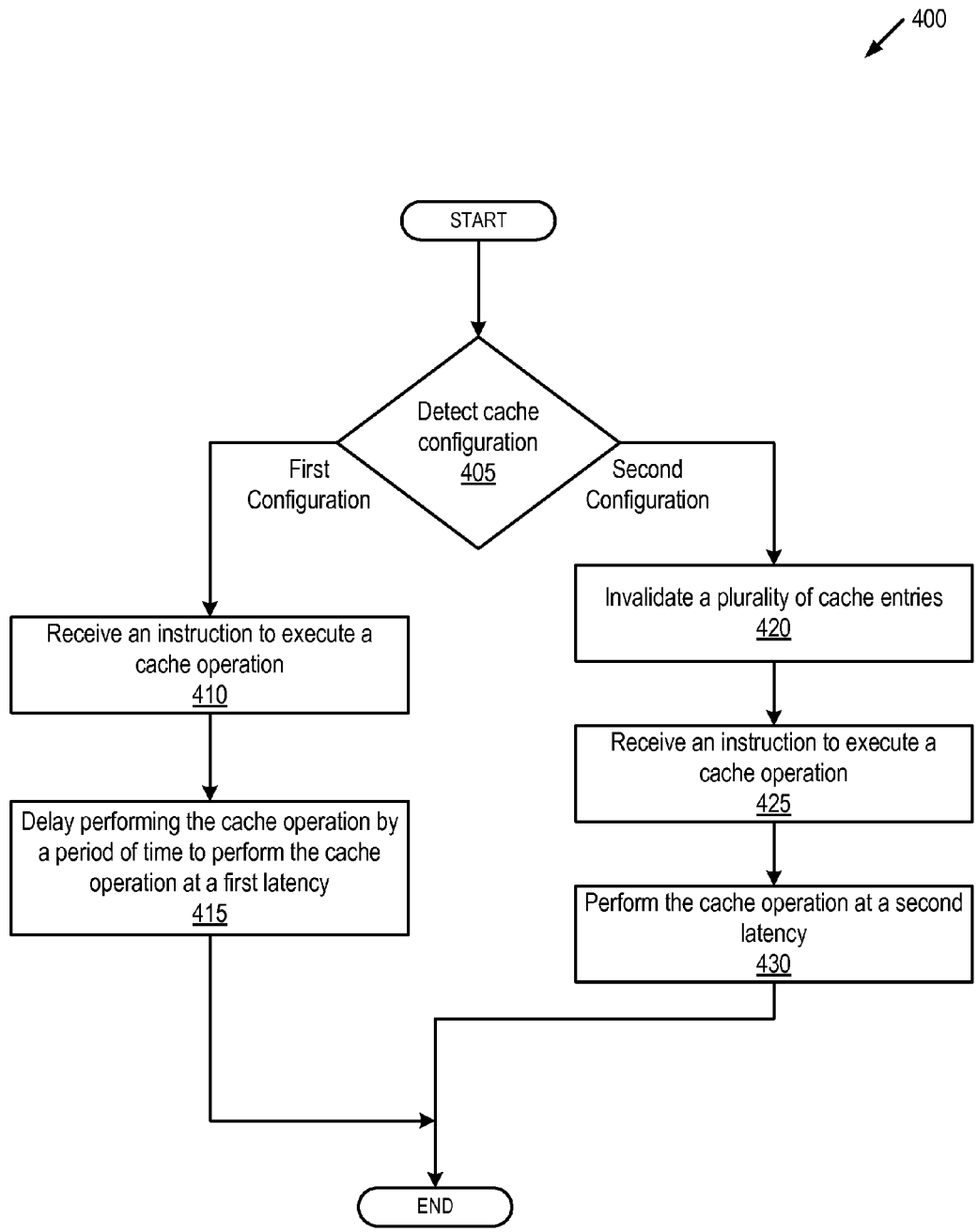
FIG. 4 is a flow diagram of a method for performing access operations on different cache configurations according to one implementation.

FIG. 4 is a flow diagram illustrating a method 400 of setting a performing a cache access operation based on a detected cache configuration according to another embodiment. Method 400 may be performed by processing logic that may comprise hardware, software, firmware or a combination thereof. In one embodiment, method 400 is performed by execution unit 105 and latency control block 113 as described herein.

Referring to FIG. 4, the method 400 begins by the processing logic detecting a configuration of a size-configurable cache (block 405). In one implementation, the processing logic can receive or identify a message from a component (e.g., a system register, a device message) of an integrated circuit that the cache is in a particular configuration. Different cache configurations can differ by at least one of a physical size of the cache, a capacity of the cache, a number of ways, a number of cache pages, a number of execution units, or a power scheme.

When the size-configurable cache is in a first configuration (e.g., a cache having a base and a removable portion), at block 410, processing logic receives an instruction to execute a cache access operation. For example, processing logic can receive an instruction to execute one or more of a tag lookup, a tag write, a tag eviction, a data read, or a data write. At block 415, processing logic delays the performing the cache access operation by a period of time to perform the cache access operation at a first latency. The first latency can corresponds to the largest latency of any portion of the cache. In the first configuration, for example, the latency can be the latency of the removable portion since it has the largest latency, as described herein.

In another embodiment, when the size-configurable cache is in a second configuration (e.g., a cache having a base portion and not having a removable portion), processing logic can invalidate multiple of cache entries 420 to configure the cache. For example, when cache configurations that support different numbers of cache entries share a common design, the maximum number of cache entries can be programmed for the cache. For configurations with less than the maximum number of cache entries, the programmed unused cache entries can be invalidated or locked. Cache entries can be invalidated or lock individually or in bulk.

At block 425, processing logic receives an instruction to execute a cache access operation and can receive the same or similar instructions as in block 410. At block 430, processing logic in the second configuration performs the cache access operation at a second latency, which can be smaller or shorter as compared to the first latency since the second configuration does not include the removable portion of the size-configurable cache.

In one embodiment, performing the cache access operation in the first configuration includes accessing a cache entry of a base portion of a size-configurable cache at the first latency. In another embodiment, performing the cache access operation in the second configuration includes accessing the cache entry of the base portion of the cache at the second latency. In yet another embodiment, delaying the performing of the cache access operation by a period of time when in the second cache configuration includes introducing a delay by an inverted clock and/or by a multiplexer.

Figure 5:
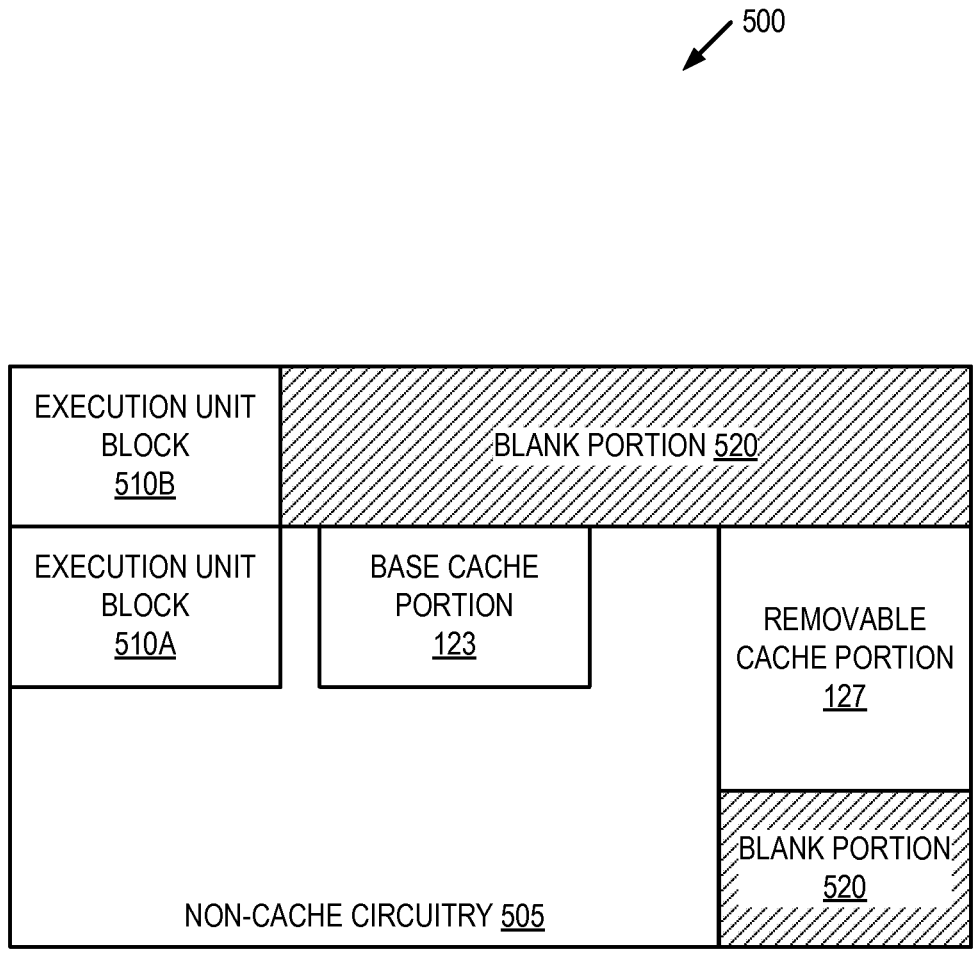
FIG. 5 illustrates a sample integrated circuit that supports a multi-latency cache.

FIG. 5 illustrates a sample integrated circuit 500 that supports a multi-latency cache. Integrated circuit 500 can be the same as, or similar to, the integrated circuit 101 of FIG. 1. Integrated circuit 500 can include base cache portion 123, removable cache portion 127, non-cache circuitry 505, execution unit block 510A, and execution unit block 510B. Non-cache circuitry 505 can be any electronic circuitry suitable for use on an integrated circuit 101 that is not cache. Execution unit blocks 510A can be a set of one or more execution units 105. Likewise, execution unit blocks 510B can be a set of one or more execution units 105.

The integrated circuit 500 can be modified to support different configurations for different platforms. Components of the integrated circuit 500 can be added or removed to create the different configurations. For example, all or part of the removable cache portion 127 can be removed from integrated circuit 500 to create a smaller size integrated circuit 500. In one embodiment, removing all or part of cache portion 127 reduces the cache capacity of the integrated circuit 500. In another example, all or part of execution unit block 510B can be removed. In a further embodiment, integrated circuit 500 includes a blank portion 520. The blank portion 520 can be blank material. When the cache portion 127 or the execution unit block 510B are removed, all or part of the blank portion 520 can be removed to reduce the overall dimensions of the integrated circuit 500. In a further embodiment, removable cache portion 127, execution unit block 510B and blank portion 520 are removed to form a cache configuration.

Figure 6:
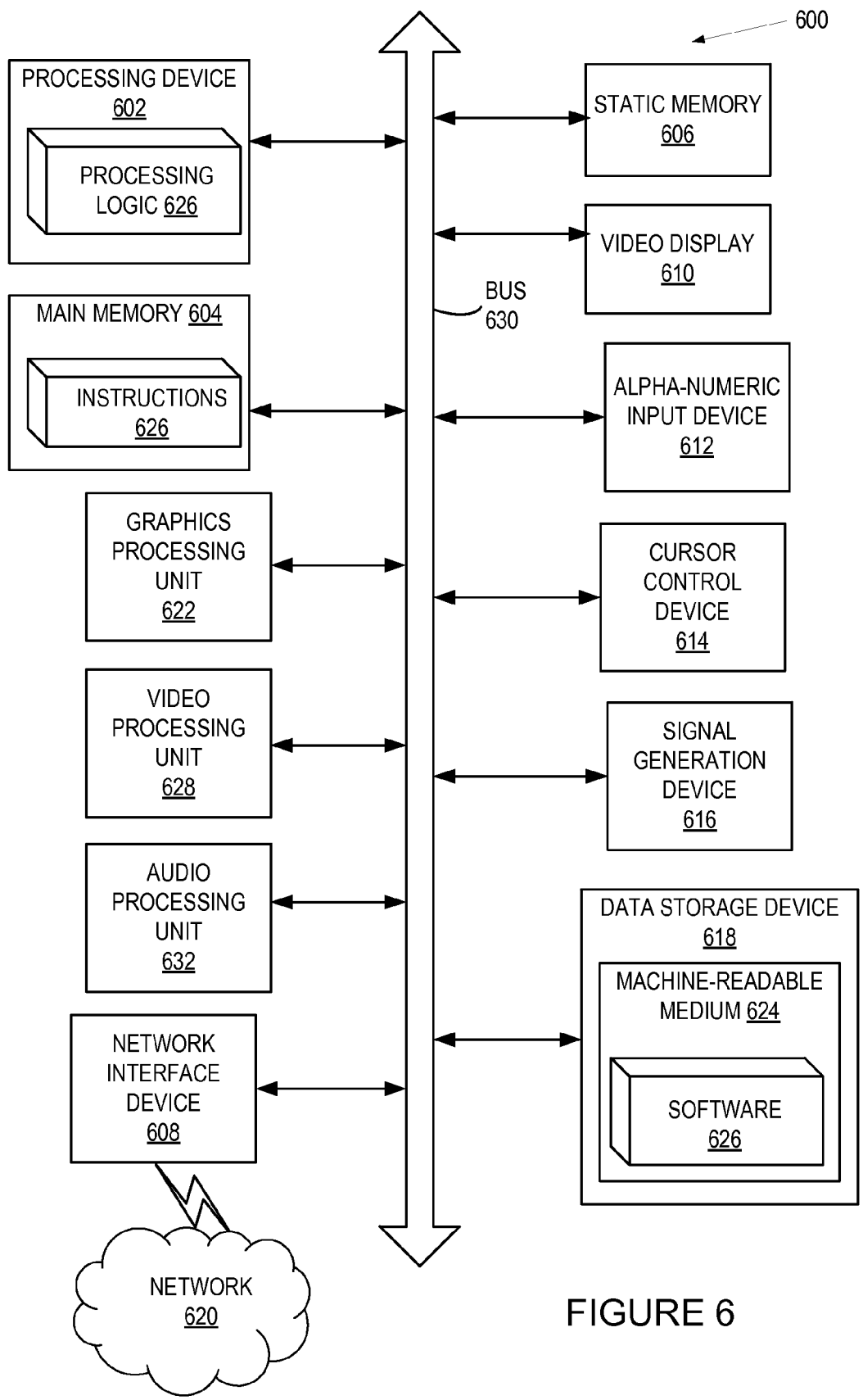
FIG. 6 illustrates a diagrammatic representation of a machine in the example form of a computing system within which a set of instructions may be executed for causing the computing system to perform any one or more of the methodologies discussed herein.

FIG. 6 illustrates a diagrammatic representation of a machine in the example form of a computing system 600 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computing system 600 includes a processing device 602, main memory 604 (e.g., read-only memory (ROM), flash memory, dynamic random access memory (DRAM) (such as synchronous DRAM (SDRAM) or DRAM (RDRAM), etc.), a static memory 606 (e.g., flash memory, static random access memory (SRAM), etc.), and a data storage device 618, which communicate with each other via a bus 630.

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. In one embodiment, processing device 602 may include one or processing cores. The processing device 602 is configured to execute the processing logic 626 for performing the operations discussed herein. In one embodiment, processing device 602 can be part of the integrated circuit 101 of FIG. 1 that implements latency control block 113. Alternatively, the computing system 600 can include other components as described herein. It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

The computing system 600 may further include a network interface device 608 communicably coupled to a network 620. The computing system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), a signal generation device 616 (e.g., a speaker), or other peripheral devices. Furthermore, computing system 600 may include a graphics processing unit 622, a video processing unit 628 and an audio processing unit 632. In another embodiment, the computing system 600 may include a chipset (not illustrated), which refers to a group of integrated circuits, or chips, that are designed to work with the processing device 602 and controls communications between the processing device 602 and external devices. For example, the chipset may be a set of chips on a motherboard that links the processing device 602 to very high-speed devices, such as main memory 604 and graphic controllers, as well as linking the processing device 602 to lower-speed peripheral buses of peripherals, such as USB, PCI or ISA buses.

The data storage device 618 may include a computer-readable storage medium 624 on which is stored software 626 embodying any one or more of the methodologies of functions described herein. The software 626 may also reside, completely or at least partially, within the main memory 604 as instructions 626 and/or within the processing device 602 as processing logic 626 during execution thereof by the computing system 600; the main memory 604 and the processing device 602 also constituting computer-readable storage media.

The computer-readable storage medium 624 may also be used to store instructions 626 utilizing the executing unit 105 or the latency control block 113, such as described with respect to FIG. 1, and/or a software library containing methods that call the above applications. While the computer-readable storage medium 624 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the present embodiments. The term "computer-readable storage medium" shall accordingly be taken to include, but not be limited to, solid-state memories, and optical and magnetic media.

Figure 7:
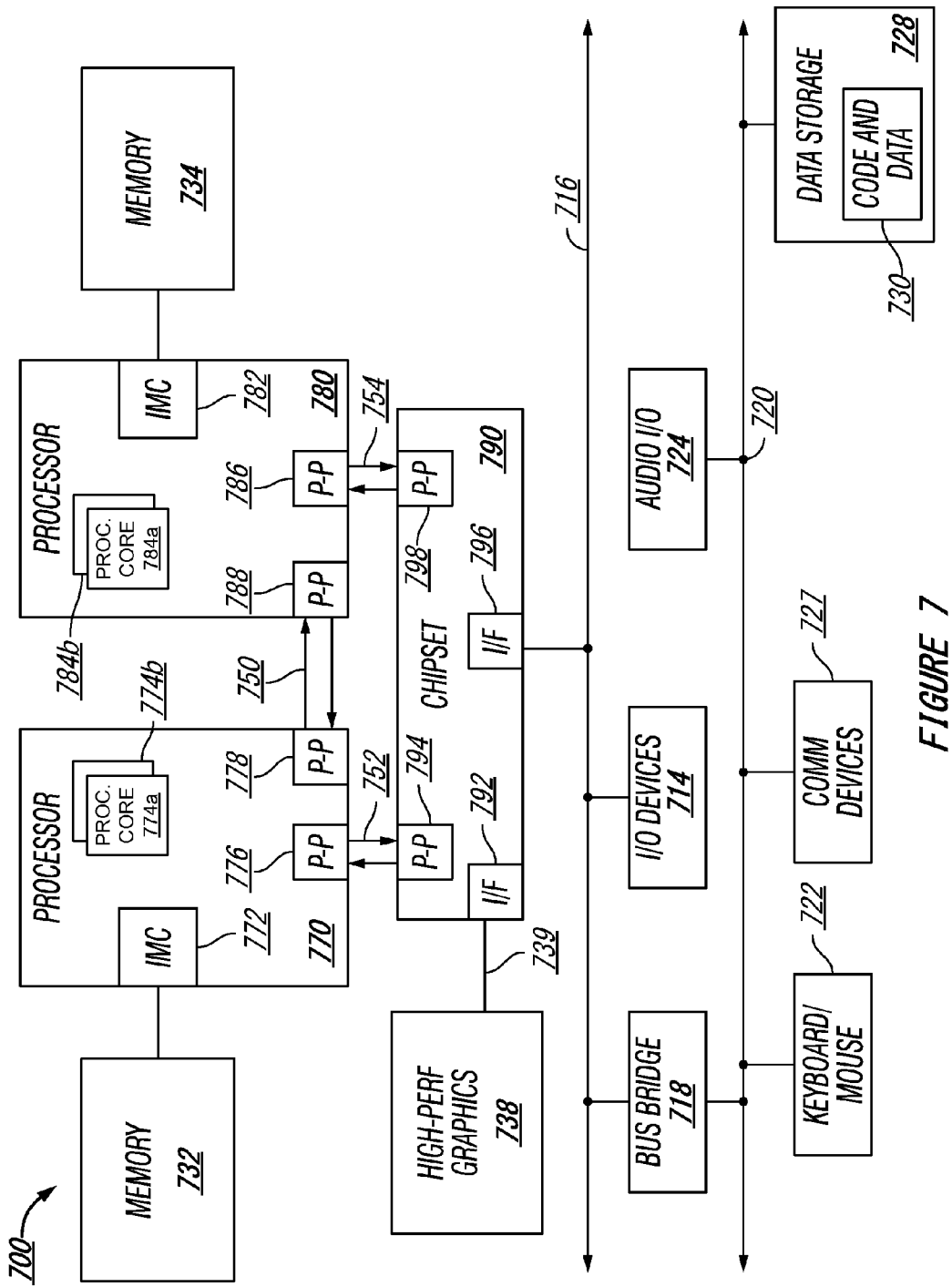
FIG. 7 is a block diagram of a computer system according to one implementation.

Embodiments may be implemented in many different system types. Referring now to FIG. 7, shown is a block diagram of a multiprocessor system 700 in accordance with an implementation. As shown in FIG. 7, multiprocessor system 700 is a point-to-point interconnect system, and includes a first processor 770 and a second processor 780 coupled via a point-to-point interconnect 750. Each of processors 770 and 780 may be some version of the processing device 602 of FIG. 6. As shown in FIG. 7, each of processors 770 and 780 may be multicore processors, including first and second processor cores (i.e., processor cores 774a and 774b and processor cores 784a and 784b), although potentially many more cores may be present in the processors. The processors each may include hybrid write mode logics in accordance with an embodiment of the present.

While shown with two processors 770, 780, it is to be understood that the scope of the present disclosure is not so limited. In other implementations, one or more additional processors may be present in a given processor.

Processors 770 and 780 are shown including integrated memory controller units 772 and 782, respectively. Processor 770 also includes as part of its bus controller units point-to-point (P-P) interfaces 776 and 778; similarly, second processor 780 includes P-P interfaces 786 and 788. Processors 770, 780 may exchange information via a point-to-point (P-P) interface 750 using P-P interface circuits 778, 788. As shown in FIG. 7, IMCs 772 and 782 couple the processors to respective memories, namely a memory 732 and a memory 734, which may be portions of main memory locally attached to the respective processors.

Processors 770, 780 may each exchange information with a chipset 790 via individual P-P interfaces 752, 754 using point to point interface circuits 776, 794, 786, 798. Chipset 790 may also exchange information with a high-performance graphics circuit 738 via a high-performance graphics interface 739.

A shared cache (not shown) may be included in either processor or outside of both processors, yet connected with the processors via P-P interconnect, such that either or both processors' local cache information may be stored in the shared cache if a processor is placed into a low power mode.

Chipset 790 may be coupled to a first bus 716 via an interface 796. In one embodiment, first bus 716 may be a Peripheral Component Interconnect (PCI) bus, or a bus such as a PCI Express bus or another third generation I/O interconnect bus, although the scope of the present disclosure is not so limited.

As shown in FIG. 7, various I/O devices 714 may be coupled to first bus 716, along with a bus bridge 718 which couples first bus 716 to a second bus 720. In one embodiment, second bus 720 may be a low pin count (LPC) bus. Various devices may be coupled to second bus 720 including, for example, a keyboard and/or mouse 722, communication devices 727 and a storage unit 728 such as a disk drive or other mass storage device which may include instructions/code and data 730, in one embodiment. Further, an audio I/O 724 may be coupled to second bus 720. Note that other architectures are possible. For example, instead of the point-to-point architecture of FIG. 7, a system may implement a multi-drop bus or other such architecture.

The embodiments are described with reference to cache configurations in specific integrated circuits, such as in computing platforms or microprocessors. The embodiments may also be applicable to other types of integrated circuits and programmable logic devices. For example, similar techniques and teachings of the embodiments described herein may be applied to other types of circuits or semiconductor devices that may also benefit from different cache configuration. For example, the disclosed embodiments are not limited to server computer systems, desktop computer systems or portable computers, such as the Intel® Ultrabooks™ computers, and may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatuses, methods, and systems described herein are not limited to physical computing devices, but may also relate to software optimizations for cache configuration. As will become readily apparent in the description below, the embodiments of methods, apparatuses, and systems described herein (whether in reference to hardware, firmware, software, or a combination thereof) are vital to a 'green technology' future balanced with performance considerations.

Although the embodiments are described with reference to a processing device, other embodiments are applicable to other types of integrated circuits and logic devices. Similar techniques and teachings of embodiments of the present invention can be applied to other types of circuits or semiconductor devices that can benefit from different cache configurations, higher pipeline throughput and improved performance. The teachings of embodiments of the present invention are applicable to any processing device or machine that performs data manipulations. However, the present invention is not limited to processing devices or machines that perform 512 bit, 256 bit, 128 bit, 64 bit, 32 bit, or 16 bit data operations and can be applied to any processing device and machine in which manipulation or management of data is performed. In addition, the description provides examples, and the accompanying drawings show various examples for the purposes of illustration. However, these examples should not be construed in a limiting sense as they are merely intended to provide examples of embodiments of the present invention rather than to provide an exhaustive list of all possible implementations of embodiments of the present invention.

Although the below examples describe instruction handling and distribution in the context of execution units and logic circuits, other embodiments of the present invention can be accomplished by way of a data or instructions stored on a machine-readable, tangible medium, which when performed by a machine cause the machine to perform functions consistent with at least one embodiment of the invention. In one embodiment, functions associated with embodiments of the present invention are embodied in machine-executable instructions. The instructions can be used to cause a general-purpose or special-purpose processing device that is programmed with the instructions to perform the present invention. Embodiments of the present invention may be provided as a computer program product or software which may include a machine or computer-readable medium having stored thereon instructions which may be used to program a computer (or other electronic devices) to perform one or more operations according to embodiments of the present invention. Alternatively, operations of embodiments of the present invention might be performed by specific hardware components that contain fixed-function logic for performing the operations, or by any combination of programmed computer components and fixed-function hardware components.

Instructions used to program logic to perform embodiments of the invention can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

The following examples pertain to further embodiments.

Example 1 is an integrated circuit comprising an execution unit and a size-configurable cache being communicably connected to the execution unit, the size-configurable cache comprising a base portion; and a removable portion, where the size-configurable cache is configured in a first cache configuration when the removable portion is not removed and is configured in a second cache configuration when the removable portion is removed; and a latency control block coupled to the execution unit and the size-configurable cache, where the latency control block is configured to set a first latency for the size-configurable cache in the first configuration and to set a second latency for the size-configurable cache in the second configuration.

In Example 2, the subject matter of Example 1 can optionally include an execution unit, at least a portion of the size-configurable cache and the latency control block that are integrated into at least one of a processor core or a graphics core.

In Example 3, the subject matter of any one of Examples 1-2 can optionally include at least a portion of the latency control block that is implemented in a latency control circuit coupled to the execution unit and the size-configurable cache.

In Example 4, the subject matter of any one of Examples 1-3 can optionally include a latency control block that is implemented in the execution unit.

In Example 5, the subject matter of any one of Examples 1-4 can optionally include a first latency that is a first amount of time to access a first cache entry in the size-configurable cache in the first configuration and the second latency that is a second amount of time to access a second cache entry in the size-configurable cache in the second configuration.

In Example 6, the subject matter of any one of Examples 1-5 can optionally include a first latency that is a greater amount of time than the second latency.

In Example 7, the subject matter of any one of Examples 1-6 can optionally include a physical position of the first cache entry that is closer to the execution unit than the physical position of the second cache entry.

In Example 8, the subject matter of any one of Examples 1-7 can optionally include an execution unit that is configured to perform an access operation.

In Example 9, the subject matter of any one of Examples 1-8 can optionally include a latency control block that comprises an inverter circuit to generate an inverted clock signal of a clock signal, where the latency control block is configured to delay the access operation on the base portion using the inverted clock signal in the first configuration.

In Example 10, the subject matter of any one of Examples 1-9 can optionally include a latency control block that is configured to introduce a phase delay, where the phase delay is at least one of a portion of a clock cycle of the clock signal or the clock cycle and a subsequent portion of a subsequent clock cycle.

In Example 11, the subject matter of any one of Examples 1-10 can optionally include a latency control block that comprises a multiplexer coupled between the execution unit and the size-configurable cache, where the multiplexer is configured to delay the access operation on the base portion in the first configuration such that the latency of the access operation on the base portion in the first configuration corresponds to the latency of a access operation on the removable portion in the first configuration.

In Example 12, the subject matter of any one of Examples 1-11 can optionally include an execution unit that is configured to delay the access operation by a cycle delay when in the first configuration, where the cycle delay is at least one clock cycle.

In Example 13, the subject matter of any one of Examples 1-12 can optionally include an execution unit is configured to invalidate a plurality of cache entries in a second operation when in the second configuration.

In Example 14, the subject matter of any one of Examples 1-13 can optionally include an access operation that is at least one of a tag lookup, a tag write, tag eviction, a data read, or a data write.

In Example 15, the subject matter of any one of Examples 1-14 can optionally include a size-configurable cache that is a non-inclusive cache in the first configuration.

In Example 16, the subject matter of any one of Examples 1-15 can optionally include a size-configurable cache that is an inclusive cache in the second configuration.

In Example 17, the subject matter of any one of Examples 1-16 can optionally include an access operation to a cache entry of the base portion that corresponds to the first latency when the size-configurable cache is in the first configuration and the access operation to the cache entry corresponds to the second latency when the size-configurable cache is in the second configuration In Example 18, the subject matter of any one of Examples 1-17 can optionally include a first latency that is a greater amount of time than the second latency.

In Example 19, the subject matter of any one of Examples 1-18 can optionally include a physical position of the first cache entry that is closer to the execution unit than the physical position of the second cache entry.

In Example 20, the subject matter of any one of Examples 1-19 can optionally include an execution unit that is configured to perform an access operation.

In Example 21, the subject matter of any one of Examples 1-20 can optionally include a latency control block that comprises a clock inverter circuit to generate an inverted clock signal of a clock signal, where the latency control block is configured to delay the access operation on the base portion using the inverted clock signal in the first configuration.

In Example 22, the subject matter of any one of Examples 1-21 can optionally include a latency control block that is configured to introduce a phase delay, where the phase delay is at least one of a portion of a clock cycle of the clock signal or the clock cycle and a subsequent portion of a subsequent clock cycle.

In Example 23, the subject matter of any one of Examples 1-22 can optionally include the latency control block comprises a multiplexer coupled between the execution unit and the size-configurable cache, where the multiplexer is configured to delay the access operation on the base portion in the first configuration such that the latency of the access operation on the base portion in the first configuration corresponds to the latency of an access operation on the removable portion in the first configuration.

In Example 24, the subject matter of any one of Examples 1-23 can optionally include an execution unit that is configured to delay the access operation by a cycle delay when in the first configuration, where the cycle delay is at least one clock cycle.

In Example 25, the subject matter of any one of Examples 1-24 can optionally include an execution unit that is configured to invalidate a plurality of cache entries in a second operation when in the second configuration.

In Example 26, the subject matter of any one of Examples 1-25 can optionally include an access operation that is at least one of a tag lookup, a tag write, tag eviction, a data read, or a data write.

In Example 27, the subject matter of any one of Examples 1-26 can optionally include a size-configurable cache that is a non-inclusive cache in the first configuration.

In Example 28, the subject matter of any one of Examples 1-27 can optionally include a size-configurable cache is an inclusive cache in the second configuration.

In Example 29, the subject matter of any one of Examples 1-28 can optionally include a first cache configuration and a second cache configuration that differ by at least one of a physical size of the cache, a capacity of the cache, a number of ways, a number of cache pages, or a power scheme.

Example 30 is a method for performing an access operation using an integrated circuit with a plurality of cache configurations comprising detecting at least one of a first cache configuration or a second cache configuration of the plurality of cache configurations of the integrated circuit, receiving an instruction to execute the access operation using an execution unit of the integrated circuit, performing the access operation when the integrated circuit is in the first cache configuration, where the performing the access operation in the first configuration comprises a first latency, and delaying the performing of the access operation by a period of time when the integrated circuit is in the second cache configuration, where the performing the access operation in the second configuration comprises a second latency that is greater than the first latency.

In Example 31, the subject matter of Example 30 can optionally perform the access operation in the first configuration by accessing a cache entry of a base portion of a cache at the first latency, where latency is an amount of time the execution unit takes to perform the access operation, and where the performing the access operation in the second configuration comprises accessing the cache entry of the base portion of the cache at the second latency.

In Example 32, the subject matter of any one of Examples 30-31 can optionally include a physical position of the first cache entry that is closer to the execution unit than the physical position of the second cache entry.

In Example 33, the subject matter of any one of Examples 30-32 can optionally the delay the performing of the access operation by a period of time when the integrated circuit is in the second cache configuration by introducing a delay by an inverted clock, the delay being a phase when the integrated circuit has the second cache configuration, where the phase is at least one of a portion of a clock cycle of the clock signal or the clock cycle and a subsequent portion of a subsequent clock cycle.

In Example 34, the subject matter of any one of Examples 30-33 can optionally include delaying the performing of the access operation by a period of time when the integrated circuit is in the second cache configuration by introducing a delay of a clock cycle by a multiplexer.

In Example 35, the subject matter of any one of Examples 30-34 can optionally include invalidating a plurality of cache entries in a second operation when in the second cache configuration.

In Example 36, the subject matter of any one of Examples 30-35 can optionally include an access operation that is at least one of a tag lookup, a tag write, tag eviction, a data read, or a data write.

In Example 37, the subject matter of any one of Examples 30-36 can optionally include a size-configurable cache is a non-inclusive cache in the first configuration.

In Example 38, the subject matter of any one of Examples 30-37 can optionally include a size-configurable cache that is an inclusive cache in the second configuration.

In Example 39, the subject matter of any one of Examples 30-38 can optionally include a first cache configuration and a second cache configuration that can differ by at least one of: a physical size of the cache, a capacity of the cache, a number of ways, a number of cache pages, or a power scheme.

Example 40 is a non-transitory, computer-readable storage medium including instructions that, when executed by a processor, cause the processor to perform operations comprising detecting at least one of a first cache configuration or a second cache configuration of the plurality of cache configurations of the integrated circuit, receiving an instruction to execute the access operation using an execution unit of the integrated circuit, performing the access operation when the integrated circuit is in the first cache configuration, where the performing the access operation in the first configuration comprises a first latency, and delaying the performing of the access operation by a period of time when the integrated circuit is in the second cache configuration, where the performing the access operation in the second configuration comprises a second latency that is greater than the first latency.

In Example 41, the subject matter of Example 40 can optionally include a first latency that is a first amount of time to access a first cache entry in the size-configurable cache in the first configuration and a second latency that is a second amount of time to access a second cache entry in the size-configurable cache in the second configuration.

Example 42 is a system comprising a peripheral device and an integrated circuit coupled to the peripheral device, the integrated circuit comprising a plurality of functional hardware units, where the plurality of functional hardware units comprise an execution unit, a size-configurable cache element comprising a base portion, and a removable portion, where the size-configurable cache is configured in a first cache configuration when the removable portion is not removed and is configured in a second cache configuration when the removable portion is removed, and a latency control block coupled to the execution unit and the size-configurable cache, where the latency control block is configured to set a first latency for the size-configurable cache in the first configuration and to set a second latency for the size-configurable cache in the second configuration.

In Example 43, the subject matter of Example 42 can optionally include an access operation to a cache entry of the base portion that corresponds to the first latency when the size-configurable cache is in the first configuration and the access operation to the cache entry corresponds to the second latency when the size-configurable cache is in the second configuration.

Example 44 is an apparatus, comprising means for detecting at least one of a first cache configuration or a second cache configuration of the plurality of cache configurations of the integrated circuit, means for receiving an instruction to execute the access operation using an execution unit of the integrated circuit, means for performing the access operation when the integrated circuit is in the first cache configuration, where the performing the access operation in the first configuration comprises a first latency, and means for delaying the performing of the access operation by a period of time when the integrated circuit is in the second cache configuration, where the performing the access operation in the second configuration comprises a second latency that is greater than the first latency.

In Example 45, the subject matter of Example 44 can optionally include means for performing the access operation in the first configuration comprises means for accessing a cache entry of a base portion of a cache at the first latency, where latency is an amount of time the execution unit takes to perform the access operation, and where the means for performing the access operation in the second configuration comprises means for accessing the cache entry of the base portion of the cache at the second latency.

In Example 46, the subject matter of any one of Examples 44-45 can optionally include a physical position of the first cache entry that is closer to the execution unit than the physical position of the second cache entry.

In Example 47, the subject matter of any one of Examples 44-46 can optionally include means for delaying the performing of the access operation by a period of time when the integrated circuit is in the second cache configuration that comprises means for introducing a delay by an inverted clock, the delay being a phase when the integrated circuit has the second cache configuration, where the phase is at least one of a portion of a clock cycle of the clock signal or the clock cycle and a subsequent portion of a subsequent clock cycle.

In Example 48, the subject matter of any one of Examples 44-47 can optionally include the means for delaying the performing of the access operation by a period of time when the integrated circuit is in the second cache configuration that comprises means for introducing a delay of a clock cycle by a multiplexer.

In Example 49, the subject matter of any one of Examples 44-48 can optionally include means for invalidating a plurality of cache entries in a second operation when in the second cache configuration In Example 50, the subject matter of any one of Examples 44-49 can optionally include a size-configurable cache that is a non-inclusive cache in the first configuration.

In Example 51, the subject matter of any one of Examples 44-50 can optionally include a size-configurable cache that is an inclusive cache in the second configuration.

In Example 52, the subject matter of any one of Examples 44-51 can optionally include a first cache configuration and a second cache configuration that can differ by at least one of: a physical size of the cache, a capacity of the cache, a number of ways, a number of cache pages, or a power scheme.

Example 53 is an apparatus comprising a size-configurable cache, and a processor core coupled to the size-configurable cache, where the computing system configured to perform the method of any one of Examples 30 to 39.

What is claimed is:

1. An integrated circuit, comprising:
   an execution unit;
   a size-configurable cache being communicably connected to the execution unit, the size-configurable cache comprising:
      a base portion; and
      a removable portion, wherein the size-configurable cache is configured in a first cache configuration when the removable portion is not removed and is configured in a second cache configuration when the removable portion is removed; and
   a latency control block coupled to the execution unit and the size-configurable cache, wherein the latency control block is configured to set a first latency for the size-configurable cache in the first configuration and to set a second latency for the size-configurable cache in the second configuration.

2. The integrated circuit of claim 1, wherein the execution unit, at least a portion of the size-configurable cache and the latency control block are integrated into at least one of a processor core or a graphics core.

3. The integrated circuit of claim 1, wherein at least a portion of the latency control block is implemented in a latency control circuit coupled to the execution unit and the size-configurable cache.

4. The integrated circuit of claim 1, wherein the latency control block is implemented in the execution unit.

5. The integrated circuit of claim 1, wherein the first latency is a first amount of time to access a first cache entry in the size-configurable cache in the first configuration and the second latency is a second amount of time to access a second cache entry in the size-configurable cache in the second configuration.

6. The integrated circuit of claim 5, wherein the first latency is a greater amount of time than the second latency.

7. The integrated circuit of claim 5, wherein a physical position of the first cache entry is closer to the execution unit than a physical position of the second cache entry.

8. The integrated circuit of claim 7, wherein the execution unit is configured to perform an access operation.

9. The integrated circuit of claim 8, wherein the latency control block comprises a clock inverter circuit to generate an inverted clock signal of a clock signal wherein the latency control block is configured to delay the access operation on the base portion using the inverted clock signal in the first configuration.

10. The integrated circuit of claim 9, wherein the latency control block is configured to introduce a phase delay, wherein the phase delay is at least one of a portion of a clock cycle of the clock signal or the clock cycle and a subsequent portion of a subsequent clock cycle.

11. The integrated circuit of claim 8, wherein the latency control block comprises a multiplexer coupled between the execution unit and the size-configurable cache, wherein the multiplexer is configured to delay the access operation on the base portion in the first configuration such that the latency of the access operation on the base portion in the first configuration corresponds to the latency of the access operation on the removable portion in the first configuration.

12. The integrated circuit of claim 8, wherein the execution unit is configured to delay the access operation by a cycle delay when in the first configuration, wherein the cycle delay is at least one clock cycle.

13. The integrated circuit of claim 8, wherein the execution unit is configured to invalidate a plurality of cache entries in a second access operation when in the second configuration.

14. The integrated circuit of claim 8, wherein the access operation is at least one of a tag lookup, a tag write, tag eviction, a data read, or a data write.

15. The integrated circuit of claim 5, wherein the size-configurable cache is a non-inclusive cache in the first configuration.

16. The integrated circuit of claim 5, wherein the size-configurable cache is an inclusive cache in the second configuration.

17. The integrated circuit of claim 1, wherein an access operation to a cache entry of the base portion corresponds to the first latency when the size-configurable cache is in the first configuration and the access operation to the cache entry corresponds to the second latency when the size-configurable cache is in the second configuration.

18. The integrated circuit of claim 1, wherein the first cache configuration and the second cache configuration differ by at least one of a physical size of the cache, a capacity of the cache, a number of ways, a number of cache pages, or a power scheme.

19. A method for performing an access operation using an integrated circuit with a plurality of cache configurations, the method comprising:
    detecting at least one of a first cache configuration or a second cache configuration of the plurality of cache configurations of the integrated circuit;
    receiving an instruction to execute the access operation using an execution unit of the integrated circuit;
    performing the access operation when the integrated circuit is in the first cache configuration, wherein the performing the access operation in the first configuration comprises a first latency; and
    delaying the performing of the access operation by a period of time when the integrated circuit is in the second cache configuration, wherein the performing the access operation in the second configuration comprises a second latency that is greater than the first latency.

20. The method of claim 19, wherein the performing the access operation in the first configuration comprises accessing a cache entry of a base portion of a cache at the first latency, wherein latency is an amount of time the execution unit takes to perform the access operation, and wherein the performing the access operation in the second configuration comprises accessing the cache entry of the base portion of the cache at the second latency.

21. The method of claim 19 further comprising
    invalidating a plurality of cache entries in a second access operation when in the second cache configuration.

22. A non-transitory, computer-readable storage medium including instructions that, when executed by a processor, cause the processor to perform operations for performing an access operation using an integrated circuit with a plurality of cache configurations comprising:
    detecting at least one of a first cache configuration or a second cache configuration of the plurality of cache configurations of the integrated circuit;
    receiving an instruction to execute the access operation using an execution unit of the integrated circuit;
    performing the access operation when the integrated circuit is in the first cache configuration, wherein the performing the access operation in the first configuration comprises a first latency; and
    delaying the performing of the access operation by a period of time when the integrated circuit is in the second cache configuration, wherein the performing the access operation in the second configuration comprises a second latency that is greater than the first latency.

23. The non-transitory, computer-readable storage medium of claim 22, wherein the first latency is a first amount of time to access a first cache entry in a size-configurable cache in the first configuration and the second latency is a second amount of time to access a second cache entry in the size-configurable cache in the second configuration.

24. A system, comprising:
    a peripheral device; and
    an integrated circuit coupled to the peripheral device, the integrated circuit comprising a plurality of functional hardware units, wherein the plurality of functional hardware units comprise:
        an execution unit;
        a size-configurable cache element comprising:
            a base portion; and
            a removable portion, wherein the size-configurable cache is configured in a first cache configuration when the removable portion is not removed and is configured in a second cache configuration when the removable portion is removed; and a latency control block coupled to the execution unit and the size-configurable cache, wherein the latency control block is configured to set a first latency for the size-configurable cache in the first configuration and to set a second latency for the size-configurable cache in the second configuration.

25. The system of claim 24, wherein an access operation to a cache entry of the base portion corresponds to the first latency when the size-configurable cache is in the first configuration and the access operation to the cache entry corresponds to the second latency when the size-configurable cache is in the second configuration.

* * * * *